United States Patent
Lomax, Jr. et al.

(10) Patent No.: US 7,622,087 B2
(45) Date of Patent: Nov. 24, 2009

(54) REACTOR AIR SUPPLY SYSTEM AND BURNER CONFIGURATION

(75) Inventors: Franklin D. Lomax, Jr., Falls Church, VA (US); Edward T. McCullough, Dallas, TX (US); Nicholas James Sazdanoff, Washington, DC (US)

(73) Assignee: H2Gen Innovations, Inc., Alexandria, VA (US)

( * ) Notice: Subject to any disclaimer, the term of this patent is extended or adjusted under 35 U.S.C. 154(b) by 411 days.

(21) Appl. No.: 11/560,552

(22) Filed: Nov. 16, 2006

(65) Prior Publication Data

US 2008/0118413 A1    May 22, 2008

(51) Int. Cl.
*B01J 19/00* (2006.01)
*B01J 10/00* (2006.01)
*B01J 8/00* (2006.01)
*F28D 21/00* (2006.01)
*B01J 7/00* (2006.01)
*F23D 14/62* (2006.01)

(52) U.S. Cl. ............... 422/198; 422/188; 422/193; 422/201; 422/204; 422/234; 48/127.9; 48/61; 48/198.8; 431/354; 431/11; 431/8

(58) Field of Classification Search ........... 422/197, 422/198, 188, 193, 201, 204, 234; 48/127.9, 48/61, 198.8; 431/354, 11, 8
See application file for complete search history.

(56) References Cited

U.S. PATENT DOCUMENTS

| | | | |
|---|---|---|---|
| 4,626,201 A | 12/1986 | Grantham | |
| 4,848,249 A | 7/1989 | LePori et al. | |
| 5,320,523 A | 6/1994 | Stark | |
| 5,725,366 A * | 3/1998 | Khinkis et al. | 431/10 |
| 6,497,856 B1 | 12/2002 | Lomax, Jr. et al. | |
| 6,585,785 B1 * | 7/2003 | Warren et al. | 48/127.9 |
| 2003/0143502 A1 * | 7/2003 | Heier et al. | 431/8 |
| 2004/0068933 A1 | 4/2004 | Nakamura et al. | |
| 2005/0194120 A1 | 9/2005 | Lomax, Jr. et al. | |
| 2005/0198900 A1 | 9/2005 | Nashburn et al. | |
| 2006/0231463 A1 | 10/2006 | Pham et al. | |

* cited by examiner

*Primary Examiner*—Walter D Griffin
*Assistant Examiner*—Lessanework Seifu
(74) *Attorney, Agent, or Firm*—Oblon, Spivak, McClelland, Maier & Neustadt, L.L.P.

(57) ABSTRACT

A reactor air supply system including a first air inlet configured to receive air supplied from a first air supply. The system includes a burner having a burner nozzle configured to discharge fuel for mixing with the first air and configured to ignite the fuel/air mixture. A second air inlet is provided that is configured to receive heated air supplied from a second air supply, and a duct is provided to receive the ignited fuel/air mixture and the heated air supplied from the second air supply. The duct has an outlet configured to connect to a reactor. The duct is configured to receive the heated second air such that the heated second air mixes with the ignited fuel/air mixture at a location downstream of the burner.

44 Claims, 9 Drawing Sheets

REACTOR AIR SUPPLY SYSTEM AND BURNER CONFIGURATION

BACKGROUND OF THE INVENTION

1. Field of the Invention

The present invention relates to an air supply system for a reactor and a burner configuration for use with the reactor.

2. Discussion of the Background

Traditional hydrocarbon steam reformer reactors operate with partial or full induced combustion air supply either from natural draft or induced draft fans. Such operation makes heat recovery using air difficult, due to the very low pressure driving forces available. Reformers with pressurized combustion air supply advantageously employ combustion air for substantial heat recovery, but incur high energy penalties to compress the combustion air.

An exemplary steam reformer that utilizes compressed air is depicted in FIG. 12. The reactor 10 depicted in FIG. 12 is from U.S. Pat. No. 6,497,856 includes, within a single housing, a water gas shift section 8 at a lower end of the housing, and a steam reforming section 7 at an upper end of the housing. In such a configuration, vaporized water and fuel enter the reactor 10 at inlet 2, then enters tubes 3 wherein the flow passes through catalyst system 5 within the steam reforming section 7 and then passes through catalyst system 6 within the water gas shift section 8, and then the flow (which is now reformate) exits the reactor 10 via outlet 4.

In order to carry out the chemical processes within the reactor 10 depicted in FIG. 12, compressed air is used to cool the exterior of the tubes 3 in the water gas shift section 8, and hot combustion gas is used to heat the exterior of the tubes 3 in the steam reforming section 7. In the water gas shift section 8, cool compressed air enters the reactor 10 through a cold air inlet 12, then travels through a shell-side of the water gas shift section 8 at the lower portion of the reactor 10, and exits the reactor 10 at a hot air outlet 13. A separating wall 14 is provided to prevent air flowing within the shell-side of the water gas shift section 8 from bypassing the hot air outlet 13. After exiting through hot air outlet 13, the air travels to an external burner assembly 18 in order mix the air with fuel and ignite the mixture to produce hot combustion gas at a temperature appropriate to heat the steam reforming section 7 of the reactor 10. The hot combustion gas is injected within the reactor 10 via a heated combustion gas inlet 15. In the steam reforming section 7, the hot combustion gas enters through the inlet 15, then travels through a shell-side of the steam reforming section 7 at the upper portion of the reactor 10, and exits the reactor 10 at a cooled combustion product outlet 16. The control of the temperature of the air flowing through the shell-side of the water gas shift section 8 and the combustion gas flowing through the shell-side of the steam reforming section 7 are critical to ensure that appropriate reactions are conducted between gas flowing within tubes 3 and the catalyst systems 5 and 6 provided within the tubes.

A particular disadvantage of steam reformers using heat recovery with combustion air is the great increase in velocity, and therefore pressure drop, through a given burner with pre-heated air. Thus, for a given burner, increased heat recovery by the combustion air preheating leads to an undesirable increase in pressure loss and thus power requirement to compress the air supply.

SUMMARY OF THE INVENTION

In an effort to eliminate the limitations on traditional steam reforming reactors, the inventors have constructed an improved air supply system and burner configuration for a reactor.

The present invention advantageously provides a reactor air supply system including a first air inlet configured to receive air supplied from a first air supply. The system includes a burner having a burner nozzle configured to discharge fuel for mixing with the first air and configured to ignite the fuel/air mixture. A second air inlet is provided that is configured to receive heated air supplied from a second air supply, and a duct is provided to receive the ignited fuel/air mixture and the heated air supplied from the second air supply. The duct has an outlet configured to connect to a reactor.

The duct is preferably and advantageously configured to receive the heated second air such that the heated second air mixes with the ignited fuel/air mixture at a location downstream of the burner. The burner is preferably and advantageously configured such that the second air does not travel through the burner.

In one embodiment, the burner of the present invention preferably includes a sleeve with the burner nozzle provided therein, and the sleeve extends within the duct to form a flow area for the heated air supplied from the second air supply source around an outer perimeter of the sleeve. In one embodiment, the duct is cylindrical, and the sleeve is cylindrical, wherein the sleeve is coaxial with the duct and the flow area is annular in shape.

The present invention further advantageously provides a method of supplying air to a reactor having a first reaction section, where the method includes providing a first air supply for supplying a first air, providing a burner having a burner nozzle for discharging fuel for mixing with the first air and for igniting the fuel/air mixture, providing a second air supply for supplying a heated second air, and providing a duct for receiving the ignited fuel/air mixture and the heated second air, the duct having an outlet connected to the first reaction section.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
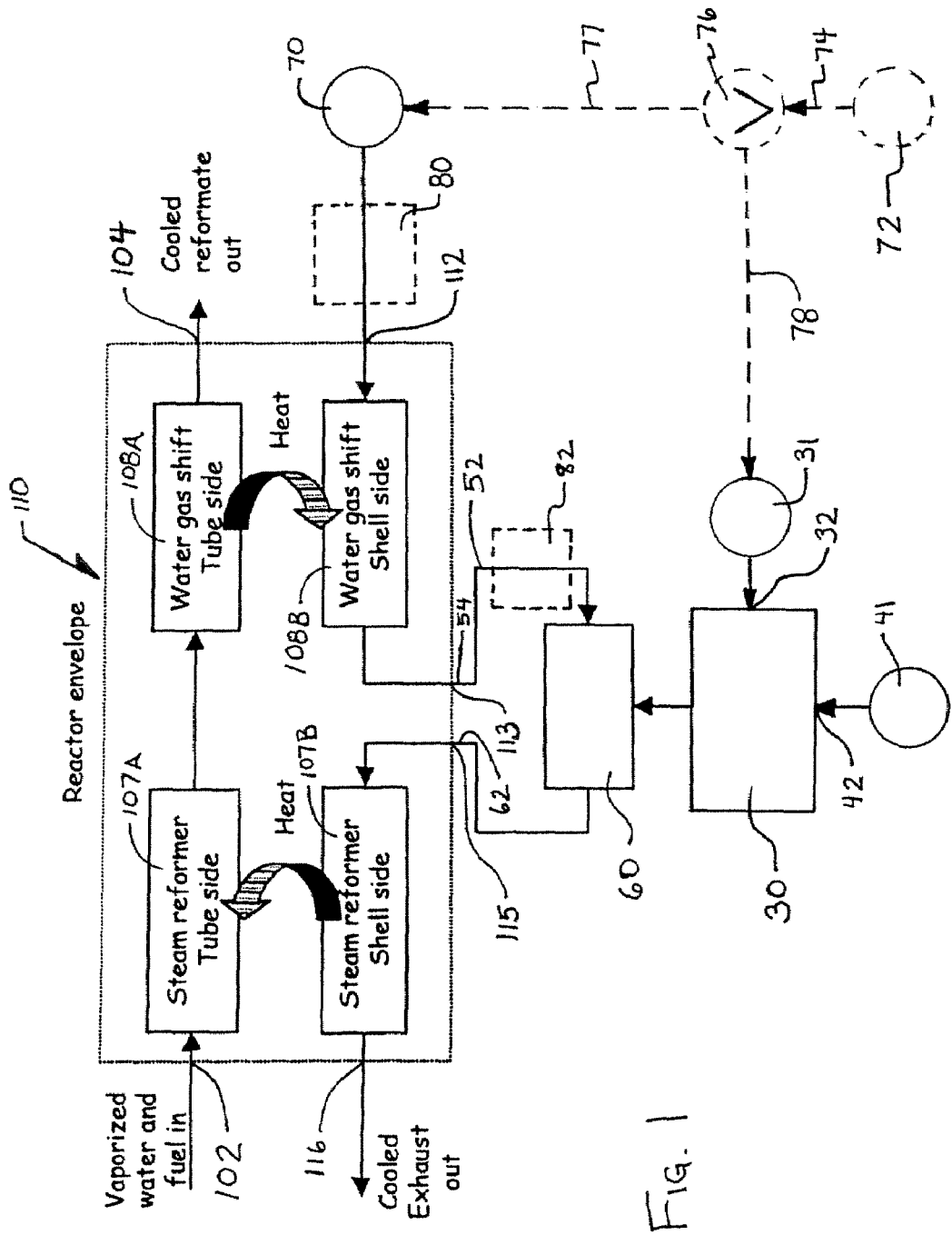
FIG. 1 is a schematic representation of an embodiment of a reactor air supply system and burner configuration of the present invention used with a reactor incorporating a steam reforming section and a water gas shift section.

Embodiments of the present invention will be described hereinafter with reference to the accompanying drawings. In the following description, the constituent elements having substantially the same function and arrangement are denoted by the same reference numerals, and repetitive descriptions will be made only when necessary.

The present invention provides an advantageous reactor air supply system and burner configuration that allows for proper temperature control and heat recovery while facilitating reduced air pressure drop in the burner assembly. It also provides a novel means for implementing the temperature control which possesses enhanced control linearity and stability compared to other methods.

Figure 12:
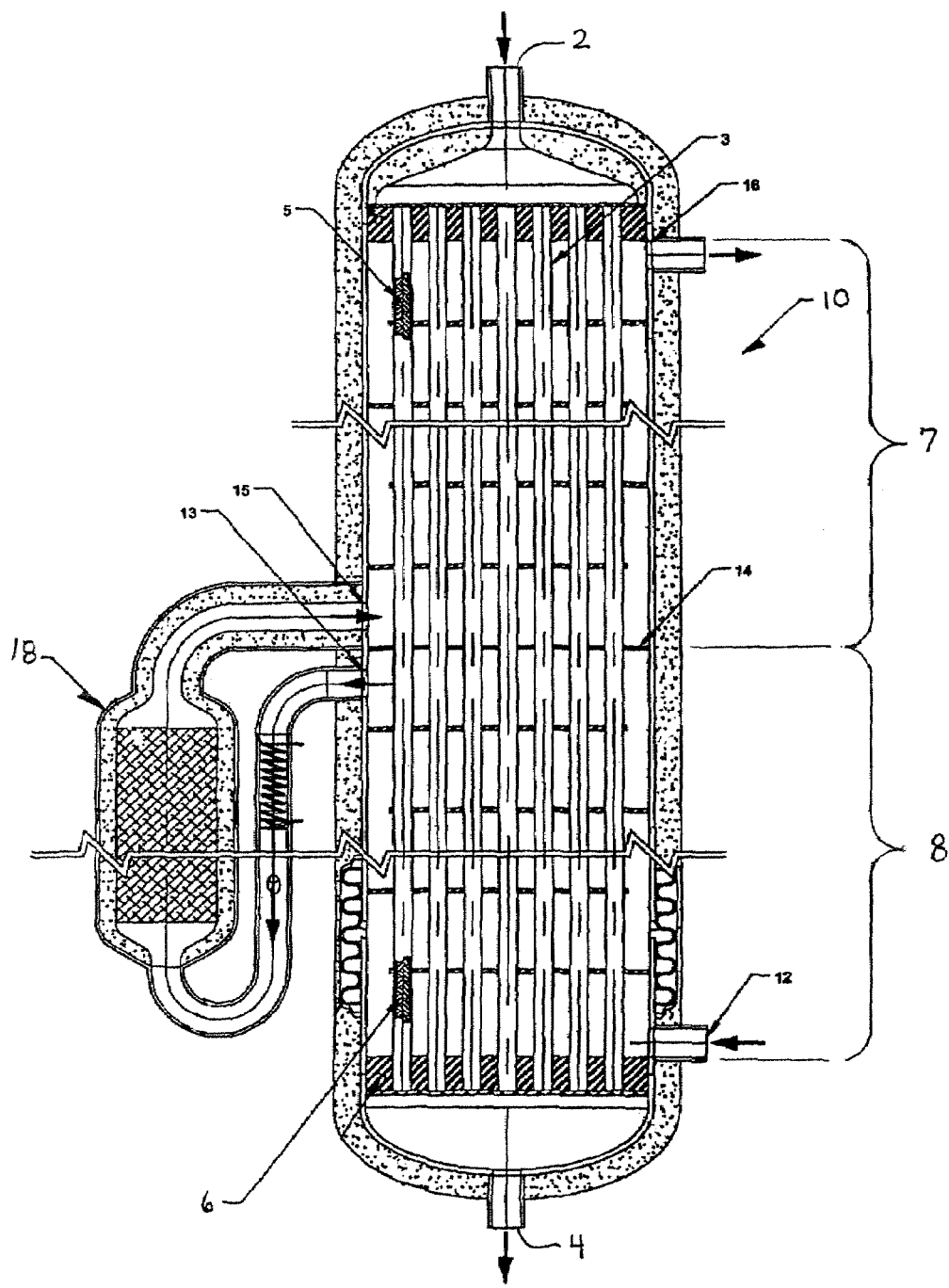
FIG. 12 is a cross-sectional view of a related art reactor.

Referring to FIG. 1, a schematic representation is provided of the overall flow geometry of an embodiment of a reactor air supply system and burner configuration of the present invention used with a reactor incorporating a steam reforming section and a water gas shift section. Note that the components within the reactor envelope of the reactor 110 depicted in FIG. 1 can be configured in the manner of the components within the housing of the related art reactor 10 depicted in FIG. 12.

In FIG. 1, the reactor 110 is provided with an inlet 102 on the tube side for entry of vaporized, mixed water and fuel, which flow through a first region (tube side steam reforming section 107A) containing steam reforming catalyst, where catalytic steam reforming takes place, and a second region (tube side water gas shift section 108A) provided with water gas shift catalyst, where the water gas shift reaction takes place, after which the reformed gases (or "reformate") exit the reactor 110 through an outlet 104. A second fluid stream (or secondary air) is supplied by secondary air supply 70 and enters the shell side via inlet 112 near the outlet 104 of the tube side, and flows through a shell side water gas shift section 108B generally in counterflow to the reformate flowing through the tube side water gas shift section 108A. This second fluid stream is lower in temperature than the exiting reformate, and thus it removes heat from the tube side water gas shift section 108A of the reactor. In the embodiment of FIG. 1, the heated air then exits the reactor 110 through an outlet 113 and is conveyed via duct 52 to a mixing duct 60. An external burner assembly 30 (which will be discussed in more detail below) is provided that receives primary air via a primary air inlet 32 from a primary air supply 31, mixes a fuel stream(s) received via a fuel inlet 42 from a fuel supply 40, and combusts the primary air-fuel mixture to produce a hot combustion gas that is discharged to the mixing duct 60. The heated air from duct 52 is mixed with the hot combustion gas from the burner assembly 30 at a location downstream of the burner assembly 30, namely, within mixing duct 60. The mixture of the heated air and the combustion gas is then sent to an inlet 115 in the reactor 110 to a shell side steam reforming section 107B of the reactor, where the hot mixture convectively heats the lower temperature reformate in the tube side steam reforming section 107A. The cooled mixture then exits the shell side steam reforming section 107B via outlet 116.

Figure 11:
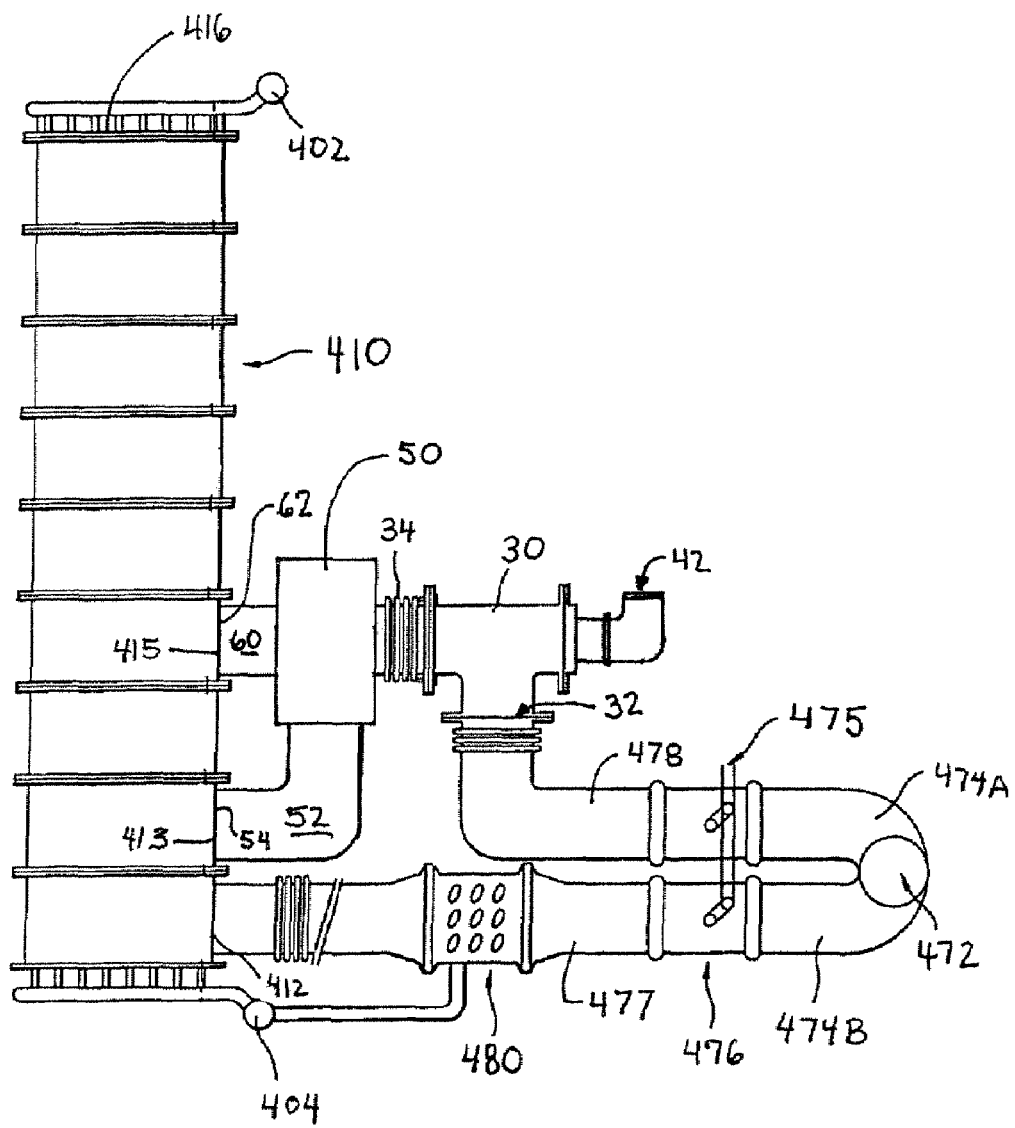
FIG. 11 is a front elevational view of a reactor air supply system and burner configuration of the present invention, where the invention is connected to a reactor and the invention incorporates a diverter valve assembly.

Numerous alternative air supply configurations are possible with the present invention. For example, in the embodiment depicted in FIG. 1, the primary air is supplied by the primary air supply 31 and the secondary air is supplied by the secondary air supply 70. In one configuration, the primary air supply 31 and the secondary air supply 70 are separate variable speed blowers that can be controlled as needed. Alternatively (as is depicted in phantom lines in FIG. 1), the primary air supply 31 and the secondary air supply 70 can be fed from a single air supply 72 and the amount of air flowing to the primary air supply 31 and amount of air supplied to the secondary air supply 70 can be controlled using a valve assembly 76. Thus, the single air supply 72 can be a variable speed blower or other air supply device that sends air via duct 74 to the valve assembly 76, and the valve assembly sends an amount of primary air to primary air supply 31 via duct 78 and an amount of secondary air to second air supply 70 via duct 77. FIG. 11, which will be discussed in more detail below, depicts a further alternative embodiment for supplying the primary and secondary air using a single air supply source.

In the embodiment depicted in FIG. 1, prior to being mixed with the hot combustion gas in the mixing duct 60, the secondary air is preheated in the shell side water gas shift section 108B by heat from the tube side water gas shift section 108A. Numerous configurations for preheating the secondary air prior to receipt within the mixing duct 60 are possible with the present invention. For example, additional preheating units can be provided, either in addition to the heating via the water gas shift section (upstream or downstream thereof) or in place of heating via a water gas shift section, along the flow path between the secondary air supply and the mixing duct 60. For example, as is depicted in phantom lines in FIG. 1, a first preheater unit 80 can be provided in between secondary air supply 70 and the inlet 112, and/or a second preheater unit 82 can be provided along duct 52. The source of the heat for such preheater units can be any type of heat source, such as a steam coil, heat from any process stream from the reactor or from some other unit used in conjunction with the reactor, or any other heat source that is available. While these configurations are not exhaustive but rather merely exemplary, FIGS. 4-9, which will be discussed in detail below, depict various different configurations that utilize different preheating units for the secondary air.

Figure 2:
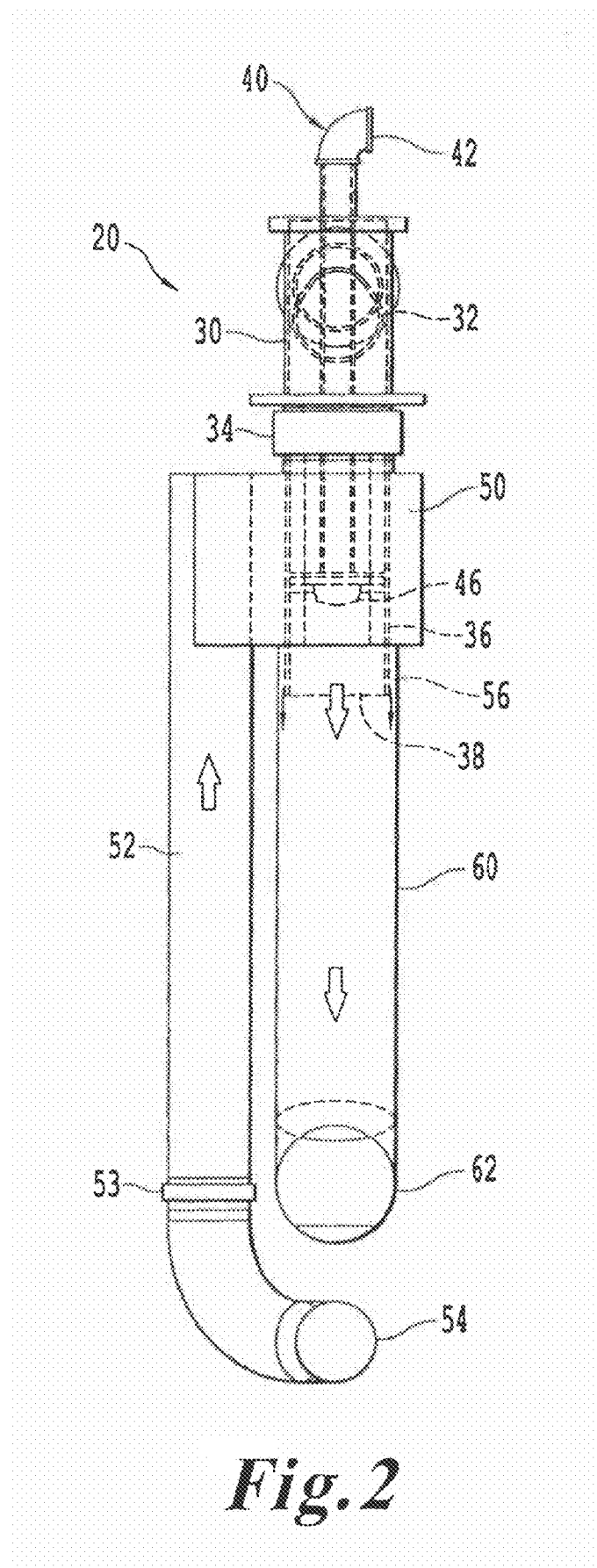
FIG. 2 is a front elevational view of a reactor air supply system and burner configuration of the present invention.
Figure 3:
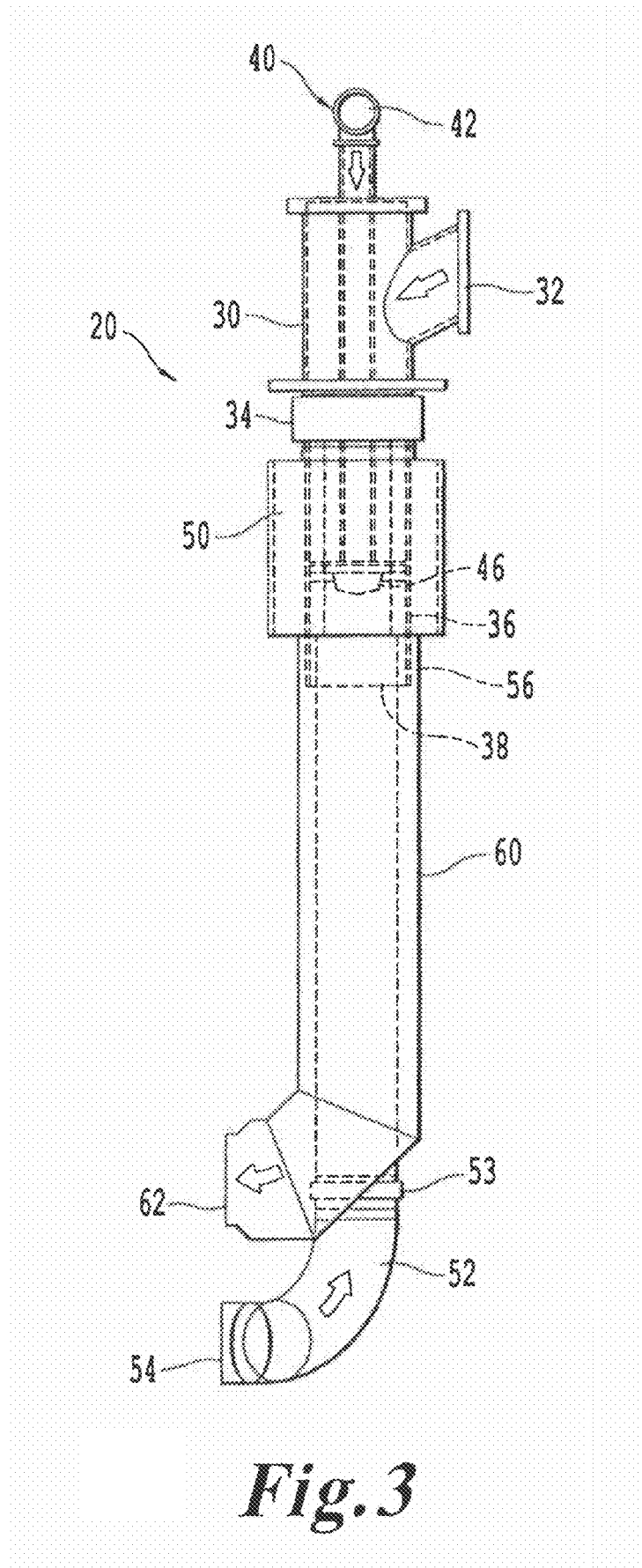
FIG. 3 is a side elevational view of the reactor air supply system and burner configuration depicted in FIG. 2.

FIGS. 2 and 3 depict an embodiment of the reactor air supply system and burner configuration 20 of the present invention. The invention includes a burner assembly 30 with a primary air inlet 32, which is connected an air supply system, such as a blower for supplying compressed air. Air enters through inlet 32 and travels downward to a sleeve 36 having an outlet 38.

The invention also includes a burner fuel supply pipe 40, which is connected to a supply source of burner fuel, such as a natural gas supply source or a source of low-btu fuel gas. The fuel supply pipe 40 extends down through the burner assembly 30 to a location within the sleeve 36. The fuel supply pipe 40 attaches to a burner nozzle 46 configured to discharge the fuel within the primary air supply for combustion within the sleeve 36. The fuel and air mixture is ignited and the hot combustion product exits the outlet 38 at the lower end of the sleeve 36. The fuel and air mixture can be ignited by a spark ignitor, a pilot burner, a glowplug, or any other ignition method known in the art. The embodiment depicted employs a single nozzle-mix burner, such as a Kromschroder ZIC 200HD burner or BIO 100HD. Alternative types of burners can be employed, such as diffusion flame, laminar premixed, flameless oxidation, or catalytic types. Any burner capable of combusting a fuel and air mixture can be employed singly or in combination (see dual-burner embodiment depicted in FIG. 10 and discussed in detail below) to achieve the objects of the present invention.

With reference to FIGS. 1-3, the reactor 110 has a secondary air supply 70 that supplies air to the cold air inlet 112, such as a blower for supplying compressed air. The secondary air travels through the shell side water gas shift section 108B of the reactor 110, and absorbs heat from the tube side water gas shift section 108A by cooling the tubes in the reactor. The heated secondary supply air then exits the reactor 110 at the hot air outlet 113. The outlet 113 is connected to a secondary air supply duct having at inlet 54. The duct 52 carries the hot secondary air to an expansion drum or diffuser section 50, which is located around the perimeter of the sleeve 36. The velocity of the secondary air in the drum 50 has a Mach number below 0.1 in one embodiment of the present invention. The duct 52 can include a bellows 53 or other expansion joint in order compensate for elongation and contraction of the duct. An annular opening 56 is provided around the outer perimeter of the lower end of the sleeve 36, which extends downward into a supply or mixing duct 60. The annular opening 56 allows the hot secondary air from the expansion drum 50 to travel downward into the supply duct 60 to form a substantially coaxial jet around the flame of the burner and mix with the combustion gases exiting the outlet 38 at the lower end of the sleeve 36.

The mixture of the hot secondary air from the expansion drum 50 and the combustion gases exiting the outlet 38 travel through supply duct 60 to outlet 62, which is connected to the hot combustion product inlet 115 of the steam reforming section of the reactor 10. Notably, the mixing of the hot secondary air from the expansion drum 50 and the combustion gases exiting the outlet 38 occurs at a location downstream of the burner.

Since the reactor and various tubes/ducts will experience high temperatures, these components will be subject to large thermal expansions. Many of these components will expand at different rates, especially since different materials can be used for the different components and since the components can be subject to different temperatures. Thus, expansion joints are preferably utilized in order to account for the resulting differential thermal expansion which can occur. Thus, the system includes various edge-welded bellows as depicted in FIGS. 2 and 3. If the burner assembly 30 is to be rigidly supported in one or more degree of freedom, such as mounting to a fixed support or to a gimbaled mount, a bellows or other expansion joint 34 can be provided to accommodate subsequent expansion of the attached ductwork. In one embodiment of the present invention where the burner assembly 30 is mounted above the attached ductwork as in FIGS. 2 and 3, the bellows 34 can advantageously be installed with pre-tension in a cold state. Upon burner operation, the ducts 52 and 60 will expand, yet the bellows 34 will remain in a state of tension, thus materially-reducing the stress at the mechanical connections 54 and 62 with the reactor 10. In a further embodiment, cooling holes can be provided in the sleeve 36 to allow a metered portion of the first air supply to be directed at the inner surface of the bellows 34 to maintain its temperature below the stress relaxation temperature for its material of construction. This step will advantageously prevent relief of the net upward force on the ductwork elements 50, 52 and 60 suspended from the bellows 34.

In one embodiment of the present invention, the burner 30 and associated apparatus for mixing the combustion product and secondary air is configured to achieve complete mixing by the time the stream enters the reactor through inlet 115. Advantageously, this mixing would occur in the shortest distance of the duct 60 in order to minimize heat loss from the duct 60, the associated duct 52, and the other apparatuses attached to the burner assembly 30. Burners for mixing a first combustion stream with a second fluid stream are offered commercially, such as by Eclipse combustion and Kromschroder. These burners are characterized by a very high velocity of the combusting mixture relative to the second fluid. This approach disadvantageously results in elevated pressure drop for the first air supply and the fuel. It also disadvantageously results in very long mixing lengths to achieve uniform temperature and composition.

Accordingly, in one embodiment of the present invention, the velocity of the secondary air leaving the annular passage 56 is equal to or greater than the velocity of the combusting mixture leaving the sleeve 36 through the outlet 38.

In another embodiment, the velocity of the secondary air through the annulus 56 is at least 50% higher than the velocity of the combusting mixture exiting sleeve 36 through outlet 38. In a further embodiment, the velocity of the secondary air through the annulus 56 is at least twice as high but is less then 5 times as high as the combusting mixture velocity departing outlet 38

The present invention provides for the advantageous separation of the air supply into a first or primary air supply to the burner, and a secondary air supply that mixes with the combustion after the burner, whereby the density of the primary air supply is advantageously increased and the flow of that primary air forced through the burner nozzle is reduced compared to the situation where the primary and secondary air supplies are mixed prior to, and thus both travel through, the burner assembly 30. This configuration reduces pressure loss dramatically for the portion of the combustion air supply used for primary combustion. In the absence of a secondary air supply, the flame temperature in the primary burner would have to be controlled by substantially diluting the combustion mixture by flowing extra primary air. This is especially true if low temperature ranges are to be achieved.

In one embodiment operated in conjunction with a hydrocarbon steam reformer, the secondary air enters the reactor through a cold air inlet 112 and exits through a hot air outlet 113. As the secondary air travels through this portion of the reactor, it is preferably heated to a temperature between 500° C. and 800° C., such that the secondary air traveling through duct 52 is within this temperature range. The primary flame exiting the sleeve 36 through outlet 38 preferably has an adiabatic flame temperature between 1100° C. and 1750° C., and the mixed flame exiting duct 60 through outlet 62 preferably has an adiabatic flame temperature between 900° C. and 1100° C. In another embodiment, the adiabatic temperature of the mixed flame exiting duct 60 through outlet 62 is between 950° C. and 1050° C.

In one embodiment, a secondary airflow rate is preferably between 50% and 80% of the total of the primary and secondary airflow rates. In another embodiment, secondary airflow rate is preferably between 50% and 70% of the total of the primary and secondary airflow rates.

The reformer of the present invention advantageously provides a configuration in which the temperature variation at the inlet of the tubes 3 is below 150° C.

As mentioned above, numerous configurations for preheating the secondary air prior to receipt within the mixing duct 60 are possible with the present invention. For example, additional preheating units can be provided, either in addition to the heating via the water gas shift section (upstream or downstream thereof) or in place of heating via a water gas shift section, along the flow path between the secondary air supply and the mixing duct 60. For example, as is depicted in phantom lines in FIG. 1, a first preheater unit 80 can be provided in between secondary air supply 70 and the inlet 112, and/or a second preheater unit 82 can be provided along duct 52. The source of the heat for such preheater units can be any type of heat source, such as a steam coil, heat from any process stream from the reactor or from some other unit used in conjunction with the reactor, or any other heat source that is available.

FIGS. 4-9 depict various different configurations that utilize different preheating units for the secondary air. These configurations are not exhaustive but rather merely exemplary of the present invention.

Figure 4:
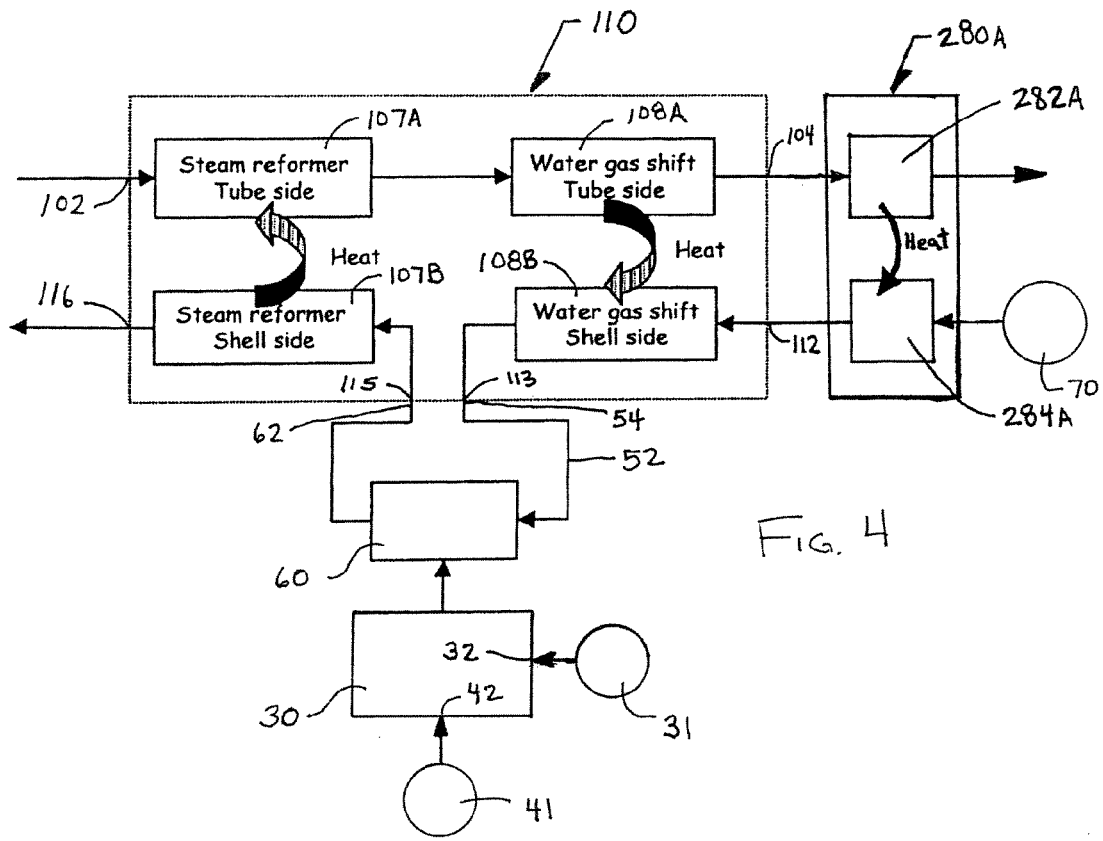
FIG. 4 is a schematic representation of an alternative embodiment of a reactor air supply system and burner configuration of the present invention used with a reactor incorporating a steam reforming section and a water gas shift section, and with a preheater unit.

Referring to FIG. 4, a schematic representation of an alternative embodiment of a reactor air supply system and burner configuration of the present invention used with a reactor 110 incorporating a steam reforming section 107A, 107B and a water gas shift section 108A, 108B, and with a preheater unit 280A. In this embodiment, the secondary air is preheated prior to entering the reactor 110 by further cooling the reformate that has exited outlet 104 of the reactor 110.

Thus, in the embodiment of FIG. 4, the reformate from the tube side water gas shift section 108A exits the reactor 110 through an outlet 104 and is provided to a first heat exchange element 282A within the preheater unit 280A. The secondary air is supplied by the secondary air supply 70 to a second heat exchange element 284A within the preheater 280A, and since the secondary air is lower in temperature than the exiting reformate, then the secondary air within the second heat exchange element 284A removes heat from the reformate within the first heat exchange element 282A. The preheated secondary air then exits the preheater unit 280A and enters the shell side water gas shift section 108B of the reactor 110 via inlet 112. The embodiment of FIG. 4 may be provided with intermediate chemical reaction or cooling of the reformate after leaving outlet 104, such as by provision of an adiabatic water gas shift reactor as in U.S. Pat. No. 6,497,856, among others.

Figure 5:
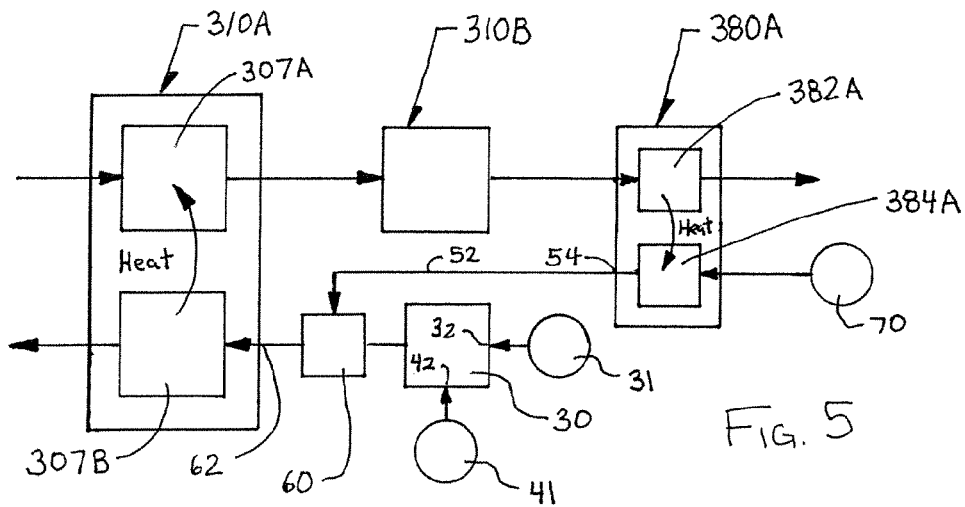
FIG. 5 is a schematic representation of an alternative embodiment of a reactor air supply system and burner configuration of the present invention used with a steam reforming reactor, with an adiabatic water gas shift reactor, and with a preheater unit.

Referring to FIG. 5, a schematic representation of an alternative embodiment of a reactor air supply system and burner configuration of the present invention is depicted with a steam reforming reactor 310A, with an adiabatic water gas shift reactor 310B, and with a preheater unit 380A. In this embodiment, rather than incorporating the water gas shift reactor in the same housing as the steam reformer and using heat transfer to facilitated the water gas shift reaction, this embodiment uses a separate adiabatic water gas shift reactor 310B in conjunction with the steam reforming reactor 310A. In this embodiment, the secondary air does not enter either reactors 310A or 310B, but rather is preheated prior to entering the mixing duct 60 by cooling the reformate that has exited the adiabatic water gas shift reactor 310B.

Thus, in the embodiment of FIG. 5, the product gas of the tube side steam reforming section 307A exits the steam reforming reactor 310A, and is supplied to the adiabatic water gas shift reactor 310B. Then, the reformate from the adiabatic water gas shift reactor 310B is supplied to a first heat exchange element 382A within the preheater unit 380A. The secondary air is supplied by the secondary air supply 70 to a second heat exchange element 384A within the preheater 380A, and since the secondary air is lower in temperature than the exiting reformate, then the secondary air within the second heat exchange element 384A removes heat from the reformate within the first heat exchange element 382A. The preheated secondary air then exits the preheater unit 380A and is supplied to the mixing duct 60 via duct 52.

Figure 6:
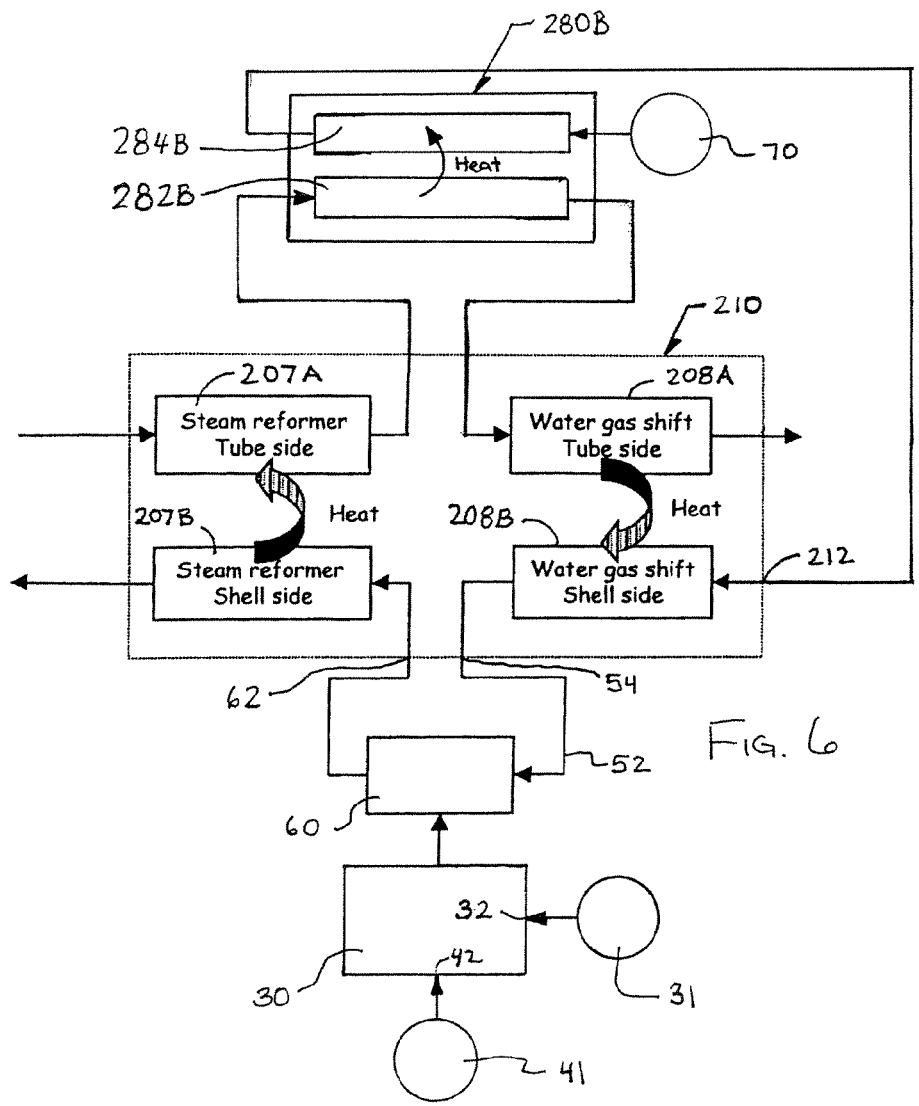
FIG. 6 is a schematic representation of an additional alternative embodiment of a reactor air supply system and burner configuration of the present invention used with a reactor incorporating a steam reforming section and a water gas shift section, and with a preheater unit.

Referring to FIG. 6, a schematic representation of an additional alternative embodiment of a reactor air supply system and burner configuration of the present invention used with a reactor 210 incorporating a steam reforming section 207A, 207B and a water gas shift section 208A, 208B, and with a preheater unit 280B. In this embodiment, the secondary air is preheated prior to entering the reactor 110 by cooling the product gas from the tube side steam reformer 207A prior to sending it to the tube side water gas shift section 208A.

Thus, in the embodiment of FIG. 6, the product gas from the tube side steam reformer 207A exits the reactor 210 and is provided to a first heat exchange element 282B within the preheater unit 280B. The secondary air is supplied by the secondary air supply 70 to a second heat exchange element 284B within the preheater 280B, and since the secondary air is lower in temperature than the product gas, then the secondary air within the second heat exchange element 284B removes heat from the product gas within the first heat exchange element 282B. The preheated secondary air then exits the preheater unit 280B and enters the shell side water gas shift section 208B of the reactor 210 via inlet 212.

Figure 7:
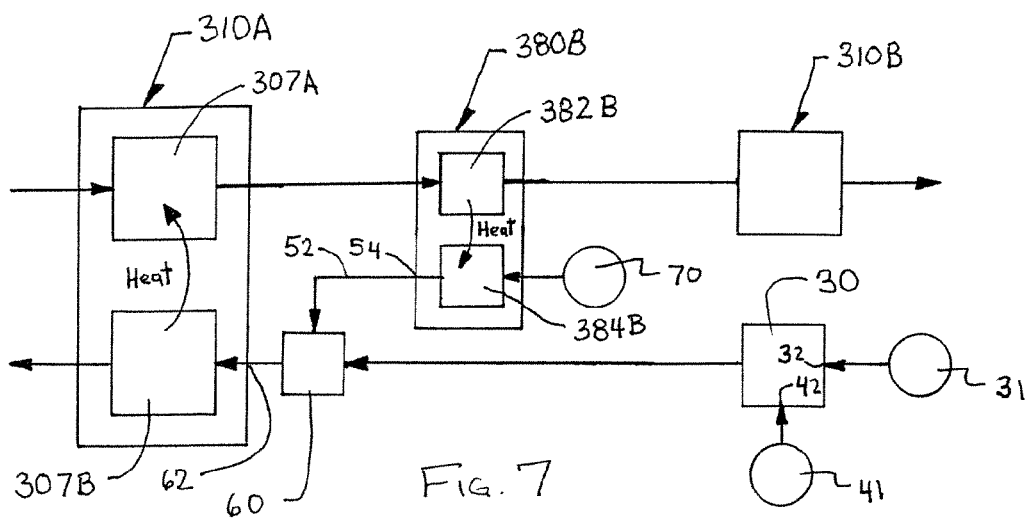
FIG. 7 is a schematic representation of an additional alternative embodiment of a reactor air supply system and burner configuration of the present invention used with a steam reforming reactor, with a preheater unit, and with an adiabatic water gas shift reactor.

Referring to FIG. 7, a schematic representation of an alternative embodiment of a reactor air supply system and burner configuration of the present invention is depicted with a steam reforming reactor 310A, with an adiabatic water gas shift reactor 310B, and with a preheater unit 380B. In this embodiment, rather than incorporating the water gas shift reactor in the same housing as the steam reformer and using heat transfer to facilitated the water gas shift reaction, this embodiment uses a separate adiabatic water gas shift reactor 310B in conjunction with the steam reforming reactor 310A. In this embodiment, the secondary air does not enter either reactors 310A or 310B, but rather is preheated prior to entering the mixing duct 60 by cooling the product gas that has exited the tube side steam reforming section 307A of the steam reforming reactor 310A.

Thus, in the embodiment of FIG. 7, the product gas of the tube side steam reforming section 307A exits the steam reforming reactor 310A, is then supplied to a first heat exchange element 382B within the preheater unit 380B, and then is supplied to the adiabatic water gas shift reactor 310B. The secondary air is supplied by the secondary air supply 70 to a second heat exchange element 384B within the preheater 380B, and since the secondary air is lower in temperature than the exiting product gas, then the secondary air within the second heat exchange element 384B removes heat from the product gas within the first heat exchange element 382B. The preheated secondary air then exits the preheater unit 380B and is supplied to the mixing duct 60 via duct 52.

Figure 8:
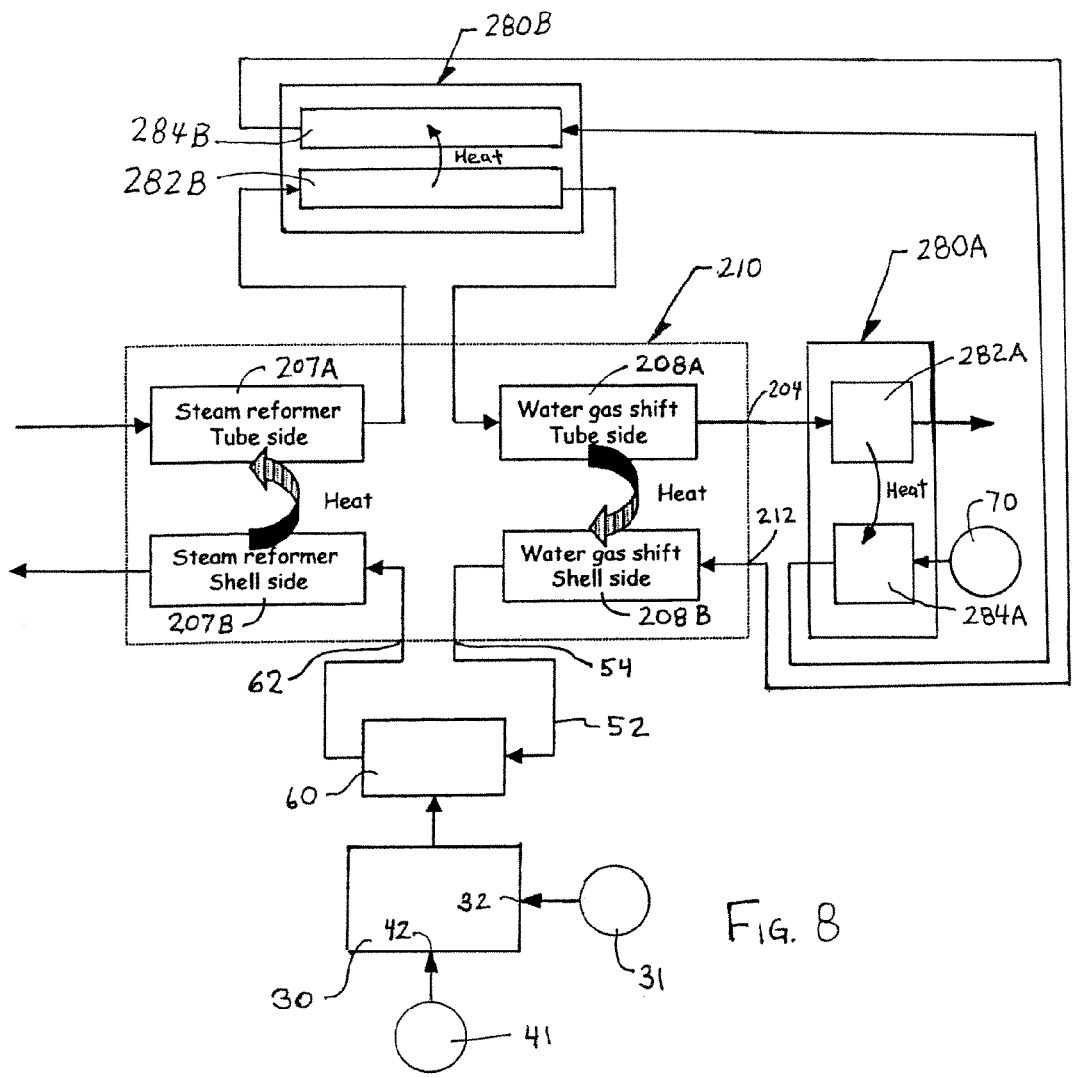
FIG. 8 is a schematic representation of an alternative embodiment of a reactor air supply system and burner configuration of the present invention used with a reactor incorporating a steam reforming section and a water gas shift section, and with a pair of preheater units.

Referring to FIG. 8, a schematic representation of an additional alternative embodiment of a reactor air supply system and burner configuration of the present invention used with a reactor 210 incorporating a steam reforming section 207A, 207B and a water gas shift section 208A, 208B, and with a pair of preheater units 280A, 280B. In this embodiment, the secondary air is supplied by the secondary air supply 70 to the second heat exchange element 284A within the preheater 280A, and since the secondary air is lower in temperature than the exiting reformate, then the secondary air within the second heat exchange element 284A removes heat from the reformate within the first heat exchange element 282A. The preheated secondary air is then supplied to the second heat exchange element 284B within the preheater 280B, and since the preheated secondary air is lower in temperature than the product gas, then the preheated secondary air within the second heat exchange element 284B removes heat from the product gas within the first heat exchange element 282B. The further preheated secondary air then exits the preheater unit 280B and enters the shell side water gas shift section 208B of the reactor 210 via inlet 212.

Figure 9:
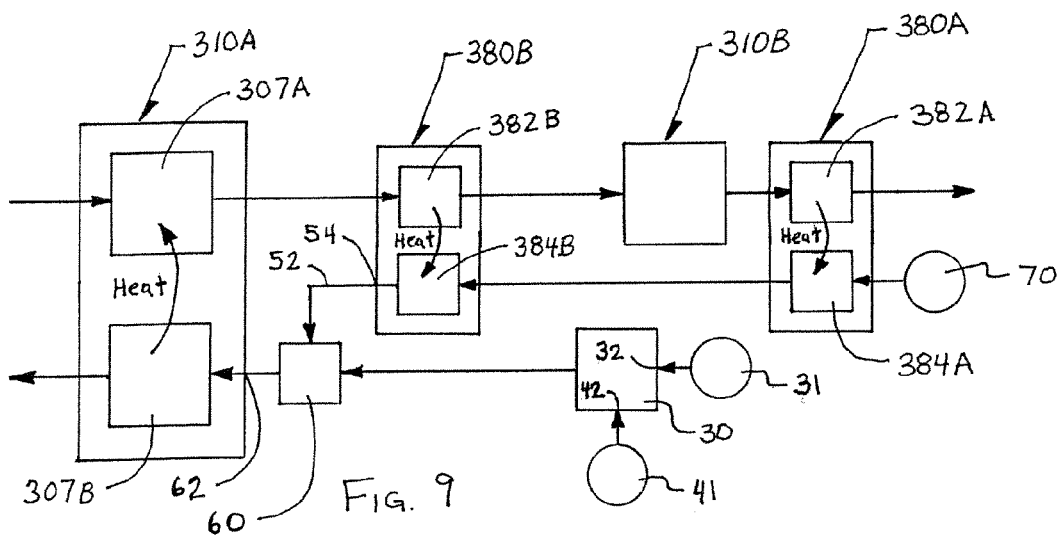
FIG. 9 is a schematic representation of an alternative embodiment of a reactor air supply system and burner configuration of the present invention used with a steam reforming reactor, with an adiabatic water gas shift reactor, and with a pair of preheater units.

Referring to FIG. 9, a schematic representation of an alternative embodiment of a reactor air supply system and burner configuration of the present invention is depicted with a steam reforming reactor 310A, with an adiabatic water gas shift reactor 310B, and with a pair of preheater units 380A, 380B. In this embodiment, the product gas of the tube side steam reforming section 307A exits the steam reforming reactor 310A, is then supplied to a first heat exchange element 382B within the preheater unit 380B, then is supplied to the adiabatic water gas shift reactor 310B, and then the reformate is supplied to a first heat exchange element 382A within the preheater unit 380A. The secondary air is supplied by the secondary air supply 70 to a second heat exchange element 384A within the preheater 380A, and since the secondary air is lower in temperature than the reformate, then the secondary air within the second heat exchange element 384A removes heat from the reformate within the first heat exchange element 382A. The preheated secondary air then exits the preheater 380A and to a second heat exchange element 384B within the preheater 380B, and since the secondary air is lower in temperature than the product gas, then the secondary air within the second heat exchange element 384B removes heat from the product gas within the first heat exchange element 382B. The further preheated secondary air then exits the preheater unit 380B and is supplied to the mixing duct 60 via duct 52.

Figure 10:
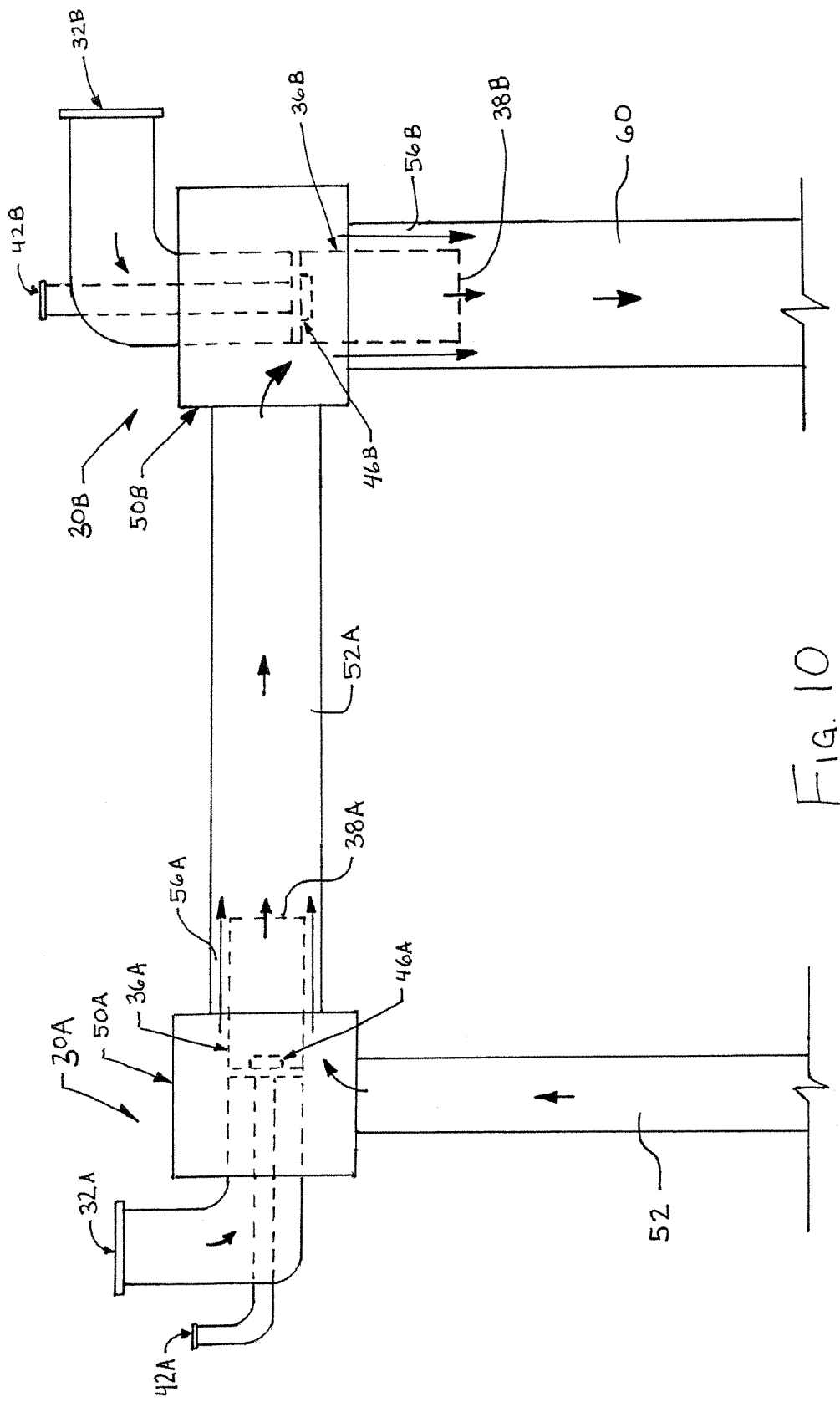
FIG. 10 is a front elevational view of a reactor air supply system and burner configuration of the present invention including dual burner assemblies.

The present invention can be used with various different burner assembly configurations. In alternative embodiments of the present invention, the combusting mixture of the first air supply and fuel can be injected other than coaxially into the secondary air. In further embodiments, more than one burner assembly can be used to combust the first air supply and the fuel for subsequent mixing with the secondary air supply. The invention can also utilize more than one burner, either in parallel or in series. FIG. 10 depicts an exemplary two burner configuration, in which two burner assemblies are arranged in series.

FIG. 10 depict an alternative embodiment of the reactor air supply system and burner configuration of the present invention. This embodiment includes two burner assemblies 30A, 30B arranged in series. The first burner assembly 30A is supplied with a primary air via a primary air inlet 32A, and burner fuel via a fuel inlet 42A. The primary air travels downward to a sleeve 36A having an outlet 38A, and the fuel travels to a burner nozzle 46A configured to discharge the fuel within the primary air supply for combustion within the sleeve 36A. The fuel and air mixture is ignited and the hot combustion exits the outlet 38A at the lower end of the sleeve 36A. Hot secondary air is supplied to a diffuser section 50A, which is located around the perimeter of the sleeve 36A, via duct 52. An annular opening 56A is provided around the outer perimeter of the lower end of the sleeve 36A, which extends downward into a mixing duct 52A. The annular opening 56A allows the hot secondary air from the expansion drum 50A to travel downward into the mixing duct 52A to form a substantially coaxial jet around the flame of the burner and mix with the combustion gases exiting the outlet 38A at the lower end of the sleeve 36A.

The mixture in duct 52A travels to the second burner assembly 30B. The second burner assembly 30b is supplied with a primary air via a primary air inlet 32B, and burner fuel via a fuel inlet 42B. The primary air travels downward to a sleeve 36B having an outlet 38B, and the fuel travels to a burner nozzle 46B configured to discharge the fuel within the primary air supply for combustion within the sleeve 36B. The fuel and air mixture is ignited and the hot combustion exits the outlet 38B at the lower end of the sleeve 36B. The hot mixture from the first burner assembly 30A is supplied to a diffuser section 50B, which is located around the perimeter of the sleeve 36B, via duct 52A. An annular opening 56B is provided around the outer perimeter of the lower end of the sleeve 36B, which extends downward into a mixing duct 60. The annular opening 56B allows the hot mixture from the expansion drum 50B to travel downward into the mixing duct 52A to form a substantially coaxial jet around the flame of the burner and mix with the combustion gases exiting the outlet 38B at the lower end of the sleeve 36B.

In the embodiment of FIG. 10, the fuel supplied to fuel inlet 42A can be the same as or different from the fuel supplied to fuel inlet 42B. Additionally, the air supplied to air inlet 32A can be from the same source, for example, using a valve to control the amount of flow to each inlet, or from different sources, for example, using two different blower units.

The present invention provides a configuration in which the secondary air can be supplied from its own blower. In such a configuration, the blower for the primary air supply and the blower for the secondary air supply can both be smaller than a configuration in which a single blower is used. The blower for the secondary air can operate at a higher pressure than the primary air blower, a lower pressure, or the same pressure. The secondary air supply can have any pressure drop required to achieve the needed heat recovery.

Alternatively, the secondary air supply can be diverted from one supply header, if such a configuration is desired, an embodiment of which will be discussed below with respect to FIG. 11. However, the control of airflow through two blowers supplied with variable speed control is more linear than the control of airflow through a diverting valve assembly, allowing simpler and more stable control of the system.

FIG. 11 depicts a front elevational view of a reactor air supply system and burner configuration of the present invention, where the invention is connected to a reactor and the invention incorporates a valve assembly such that a single air supply can be used for both the primary air supply and the secondary air supply.

FIG. 11 depicts a reactor 410 is provided with an inlet 402 on the tube side for entry of vaporized, mixed water and fuel, which flow through a tube side steam reforming section, where catalytic steam reforming takes place, and a tube side water gas shift section, where the water gas shift reaction takes place, after which the reformed gases (or "reformate") exit the reactor 410 through an outlet 404. A second fluid stream (or secondary air) enters the shell side via inlet 412, and flows through a shell side water gas shift section. The heated secondary air then exits the reactor 410 through an outlet 413 and is conveyed via duct 52 to a mixing duct 60. An external burner assembly 30 is provided that receives primary air via a primary air inlet 32, mixes a fuel stream(s) received via a fuel inlet 42, and combusts the primary air-fuel mixture to produce a hot combustion gas that is discharged to the mixing duct 60. The heated air from duct 52 is mixed with the hot combustion gas from the burner assembly 30 at a location downstream of the burner assembly 30, namely, within mixing duct 60. The mixture of the heated air and the combustion gas is then sent to an inlet 415 in the reactor 410 to a shell side steam reforming section of the reactor, where the hot mixture convectively heats the lower temperature reformate in the tube side steam reforming section. The cooled mixture then exits the shell side steam reforming section via outlet 416.

In the embodiment depicted in FIG. 11, the reformate exiting the reactor 410 via outlet 404 is used to preheat the secondary air using preheater unit 480.

Furthermore, in the embodiment depicted in FIG. 11, the primary air supply and the secondary air supply are fed from a single air supply at inlet 472 and the amount of air flowing to the primary air supply and amount of air supplied to the secondary air supply is controlled using a diverter valve assembly 476. Thus, the single air supply 472 can be a variable speed blower or other air supply device that sends air via ducts 474A, 474B to the diverter valve assembly 476, and the valve assembly sends an amount of primary air to the primary air supply via duct 478 and an amount of secondary air to the second air supply via duct 477.

The diverter valve assembly 476 can control the flow of air along passages 477 and 478 by valves, which can be, for example, proportional butterfly valves controlled by an actuator configured to drive a control linkage 475 connected to both valves or individual actuators configured to control the valves independently. In an alternative embodiment, the two valves can be replaced with a single valve that continuously modulates flow between the passages 477 and 478, such valves are known in the art and referred to variously as diverter or selector valves. In another alternative embodiment, one passage may be provided with a continuously modulating valve while the other passage is provided with no valve. In this embodiment, pressure losses in the system are advantageously reduced but the range of flow variation is disadvantageously decreased. This alternative embodiment may be preferred in situations where only a small dynamic range of flow ratios between the two passages is desired.

In another embodiment of the present invention, the air supply system for a reactor and burner configuration for use with the reactor of the present invention can be used with a multiple tube bundle reformer such as, for example, the heat exchanger having plural tubular arrays disclosed in U.S. App. Pub. No. 2005/0194120 A1.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A reactor comprising:
    a first air supply configured to supply a first air;
    a second air supply configured to supply a second air;
    a first reaction section;
    a heat exchange section configured to receive the second air, the heat exchange section having a heat source configured to heat the second air;
    a burner including a burner nozzle configured to discharge fuel for mixing with the first air and configured to ignite the fuel/air mixture; and
    a duct with a first inlet configured to receive the ignited fuel/air mixture from the burner and a second inlet configured to receive the heated second air from the heat exchange section, the duct having an outlet connected to the first reaction section,
    wherein the duct is configured to receive the heated second air such that the heated second air mixes with the ignited fuel/air mixture at a location downstream of the burner, and
    wherein the heat source is separated from the burner.

2. The reactor according to claim 1, wherein the burner is configured such that the second air does not travel through the burner.

3. The reactor according to claim 1, wherein the heat exchange section is a second reaction section in fluid connection to the first reaction section.

4. The reactor according to claim 3, wherein the first reaction section and the second reaction section are provided within a single housing.

5. The reactor according to claim 1, wherein the heat source of the heat exchange section is a fluid heated by a second reaction section in fluid connection to the first reaction section.

6. The reactor according to claim 1, wherein the heat source of the heat exchange section is a fluid heated by the first reaction section.

7. The reactor according to claim 1, wherein a single air supply source is configured to feed air to the first air supply and the second air supply.

8. The reactor according to claim 1, wherein:
    the burner includes a sleeve with the burner nozzle provided therein, and
    the sleeve extends within the duct to form a flow area for the heated second air supplied from the second air supply around an outer perimeter of the sleeve.

9. The reactor according to claim 8, wherein:
    the duct is cylindrical,
    the sleeve is cylindrical, and
    wherein the sleeve is substantially-coaxial with the duct and the flow area is annular in shape.

10. The reactor according to claim 1, further comprising a diffuser section configured to receive the second air from the heat exchange section and discharge the second air within the duct.

11. The reactor according to claim 1, wherein the first air supply is a first variable speed blower and the second air supply is a second variable speed blower.

12. The reactor according to claim 1, wherein the first air supply is a first duct connected to a diverting valve assembly and the second air supply is a second duct connected to the diverting valve assembly, and wherein the diverting valve assembly is connected to a single blower.

13. The reactor according to claim 1, further comprising an additional burner having a burner nozzle configured to discharge an additional fuel for mixing with an additional air and configured to ignite the additional fuel/air mixture; and an additional duct configured to receive the ignited additional fuel/air mixture and the ignited fuel/air mixture and the heated second air from the duct, the additional duct having an outlet connected to the first reaction section.

14. A reactor air supply system comprising:
    a first air inlet configured to receive air supplied from a first air supply;
    a burner including a burner nozzle configured to discharge fuel for mixing with the first air and configured to ignite the fuel/air mixture;
    a second air inlet configured to receive heated air supplied from a second air supply and heated by a heat source; and
    a duct with a first inlet configured to receive the ignited fuel/air mixture from the burner and a second inlet configured to receive the heated air supplied from the second air supply, the duct having an outlet configured to connect to a reactor, wherein the duct is configured to receive the heated air from the second air supply such that the heated air mixes with the ignited fuel/air mixture at a location downstream of the burner, and wherein the heat source is separated from the burner.

15. The reactor air supply system according to claim 14, wherein the burner is configured such that the heated air from the second air supply does not travel through the burner.

16. The reactor air supply system according to claim 14, wherein a single air supply source is configured to feed air to the first air supply and the second air supply.

17. The reactor air supply system according to claim 14, wherein:

the burner includes a sleeve with the burner nozzle provided therein, and the sleeve extends within the duct to form a flow area for the heated air supplied from the second air supply around an outer perimeter of the sleeve.

18. The reactor air supply system according to claim 17, wherein:

the duct is cylindrical, the sleeve is cylindrical, and wherein the sleeve is coaxial with the duct and the flow area is annular in shape.

19. The reactor air supply system according to claim 14, further comprising a diffuser section configured to receive the heated air supplied from the second air supply and discharge the heated air within the duct.

20. The reactor air supply system according to claim 14, wherein the first air supply is a first variable speed blower and the second air supply is a second variable speed blower.

21. The reactor air supply system according to claim 14, wherein the first air supply is a first duct connected to a diverting valve assembly and the second air supply is a second duct connected to the diverting valve assembly, and wherein the diverting valve assembly is connected to a single blower.

22. The reactor air supply system according to claim 14, further comprising an additional burner having a burner nozzle configured to discharge an additional fuel for mixing with an additional air and configured to ignite the additional fuel/air mixture; and an additional duct configured to receive the ignited additional fuel/air mixture and the ignited fuel/air mixture and the heated second air from the duct, the additional duct having an outlet configured to connect to the reactor.

23. A method of supplying air to a reactor having a first reaction section, the method comprising:

providing a first air supply for supplying a first air;

providing a burner including a burner nozzle for discharging fuel for mixing with the first air and for igniting the fuel/air mixture;

providing a second air supply for supplying a heated second air heated by a heat source; and providing a duct with a first inlet for receiving the ignited fuel/air mixture from the burner and a second inlet configured to receive the heated second air, the duct having an outlet connected to the first reaction section, wherein the duct receives the heated second air such that the heated second air mixes with the ignited fuel/air mixture at a location downstream of the burner, and wherein the heat source is separated from the burner.

24. The method according to claim 23, wherein the heated second air does not travel through the burner.

25. The method according to claim 23, wherein the heated second air is supplied via a second reaction section in fluid connection to the first reaction section.

26. The method according to claim 25, wherein the first reaction section and the second reaction section are provided within a single housing.

27. The method according to claim 23, wherein the heated second air is supplied via a heat exchange section including the heat source, the heat source being a fluid heated by a second reaction section in fluid connection to the first reaction section.

28. The method according to claim 23, wherein the heated second air is supplied via a heat exchange section including the heat source, the heat source being a fluid heated by the first reaction section.

29. The method according to claim 23, wherein a single air supply source feeds air to the first air supply and the second air supply.

30. The method according to claim 23, wherein:

the burner includes a sleeve with the burner nozzle provided therein, and the sleeve extends within the duct to form a flow area for the second air around an outer perimeter of the sleeve.

31. The method according to claim 30, wherein:

the duct is cylindrical, the sleeve is cylindrical, and wherein the sleeve is provided coaxial with the duct and the flow area is annular in shape.

32. The method according to claim 23, wherein an airflow rate of the second air entering the duct is between 50% and 80% of a sum of the first and second airflow rates entering the duct.

33. The method according to claim 23, wherein an airflow rate of the second air entering the duct is between 50% and 70% of a sum of the first and second airflow rates entering the duct.

34. The method according to claim 31, wherein a ratio of a velocity of the second air through the flow area to a velocity of a first air through an outlet of the burner is at least 1:1.

35. The method according to claim 31, wherein a ratio of a velocity of the second air through the flow area to a velocity of a first air through an outlet of the burner is at least 1.5:1 and less than 5:1.

36. The method according to claim 23, further comprising providing a diffuser section for receiving the second air and discharging the second air within the duct.

37. The method according to claim 36, wherein the diffuser section provides the second air entering the duct with a Mach number below 0.1.

38. The method according to claim 25, wherein the second air exits the second reaction section at a temperature between 500° C. and 800° C.

39. The method according to claim 23, wherein the burner has a primary flame between the first air supply and the fuel supply with an adiabatic temperature between 1100° C. and 1750° C.

40. The method according to claim 23, wherein the mixture of the ignited fuel/air mixture and the second air exits the outlet of the duct at a temperature between 900° C. and 1100° C.

41. The method according to claim 23, wherein the mixture of the ignited fuel/air mixture and the second air exits the outlet of the duct at a temperature between 950° C. and 1050° C.

42. The method according to claim 23, wherein the first air supply is a first variable speed blower and the second air supply is a second variable speed blower.

43. The method according to claim 23, wherein the first air supply is a first duct connected to a diverting valve assembly and the second air supply is a second duct connected to the diverting valve assembly, and wherein the diverting valve assembly is connected to a single blower.

44. The method according to claim 23, further comprising:
providing an additional burner having a burner nozzle for discharging additional fuel for mixing with additional air and for igniting the additional fuel/air mixture; and
providing an additional duct for receiving the additional ignited fuel/air mixture and the ignited fuel/air mixture and heated second air from the duct, the additional duct having an outlet connected to the first reaction section.

* * * * *